(12) United States Patent
Tang et al.

(10) Patent No.: US 12,375,358 B2
(45) Date of Patent: Jul. 29, 2025

(54) CELL SITES MONITORING AND/OR MANAGEMENT IN 5G RADIO-ACCESS NETWORKS

(71) Applicant: VMware LLC, Palo Alto, CA (US)

(72) Inventors: Qiang Tang, Beijing (CN); Ashvin Lakshmikanta, Karnataka (IN); Kiran Kumar Cherivirala, Karnataka (IN); Rohit Muttepwar, Maharashtra (IN); Siva Polepalli, Bangalore-Karnataka (IN); Hemant Sadana, Karnataka (IN); Praveen Saxena, Karnataka (IN); Weiqing Wu, Palo Alto, CA (US); Sureshbabu Koyadan Chathoth, Karnataka (IN); Anurag Dwivedi, Karnataka (IN)

(73) Assignee: VMware LLC, Palo Alto, CA (US)

( * ) Notice: Subject to any disclaimer, the term of this patent is extended or adjusted under 35 U.S.C. 154(b) by 35 days.

(21) Appl. No.: 18/405,759

(22) Filed: Jan. 5, 2024

(65) Prior Publication Data
US 2025/0126023 A1    Apr. 17, 2025

Related U.S. Application Data

(63) Continuation of application No. PCT/CN2023/124464, filed on Oct. 13, 2023.

(51) Int. Cl.
*G06F 15/173* (2006.01)
*H04L 41/122* (2022.01)

(52) U.S. Cl.
CPC ............... *H04L 41/122* (2022.05)

(58) Field of Classification Search
CPC ................. H04L 41/122; H04L 41/12
See application file for complete search history.

(56) References Cited

U.S. PATENT DOCUMENTS

| | | |
|---|---|---|
| 2019/0097926 A1* | 3/2019 | Raj ............... H04L 69/40 |
| 2023/0094120 A1 | 3/2023 | Basur Shankarappa et al. |
| 2023/0229477 A1 | 7/2023 | Lin et al. |

OTHER PUBLICATIONS

Govindarajan, K. et al., Network Aware Container Orchestration for Telco Workloads, 2022 IEEE 15th International Conference on Cloud Computing (Cloud), 2022, pp. 397-406.
European Patent Office, Extended Search Report, Application No. 24150576.7, Jun. 11, 2024, 10 pages.

* cited by examiner

*Primary Examiner* — Joseph R Maniwang
(74) *Attorney, Agent, or Firm* — Quarles & Brady LLP

(57) ABSTRACT

An example method for managing a cell site in a 5G RAN may include determining a physical infrastructure layer, a container orchestration platform on the physical infrastructure layer, and a CNF instance associated with the 5G RAN in the container orchestration platform based on a site identifier associated with the cell site. Based on the physical infrastructure layer, the container orchestration platform, and the CNF instance, the method may include building a logical site resource map representing topological information of the cell site. Further, the method may include monitoring and/or managing the cell site using the logical site resource map.

20 Claims, 5 Drawing Sheets

CELL SITES MONITORING AND/OR MANAGEMENT IN 5G RADIO-ACCESS NETWORKS

CROSS-REFERENCE TO RELATED APPLICATIONS

This application is a continuation of PCT/CN2023/124464 filed on Oct. 13, 2023, by TANG et al. and titled, "CELL SITES MONITORING AND/OR MANAGEMENT IN 5G RADIO-ACCESS NETWORKS," the entire teachings of which is incorporated herein by reference in its entirety for all purposes.

TECHNICAL FIELD

The present disclosure relates to wireless communication networks.

BACKGROUND 5G radio-access network (RAN) in wireless communications uses 5G radio frequencies to provide wireless connectivity to devices. 5G mobile communication revolutionized the way to interact with each other with a number of applications (e.g., telemedicine, robotic surgery, self-organizing autonomous cars, internet of things (IoT), and so on) that are riding on 5G. The 5G offers Gigabit speeds with ultra-low latencies. Further, the telecommunication industry is accelerating as transition to 5G business, container orchestration platform, and cloud-native network functions (CNFs) solutions are getting more attention and deployment.

A RAN is a key component of a mobile telecommunication system that connects devices (e.g., smartphones, personal computers, and the like) to a network via a radio link. This is achieved by converting voice and data into digital signals and transmitting them as radio waves to RAN transceivers, which then forward them onto the core network. From the core network, the data can be sent to the internet. The RAN is the radio element of a cellular network. A cellular network is made up of land areas called base stations or cell sites. In such an environment, stringent latency requirements and the ultra-high speeds imply that a significantly large number of cell sites may have to be deployed. For example, the number of base-stations that has to be deployed in a country such as the USA may be in the range of 250,000-300,000.

Figure 1:
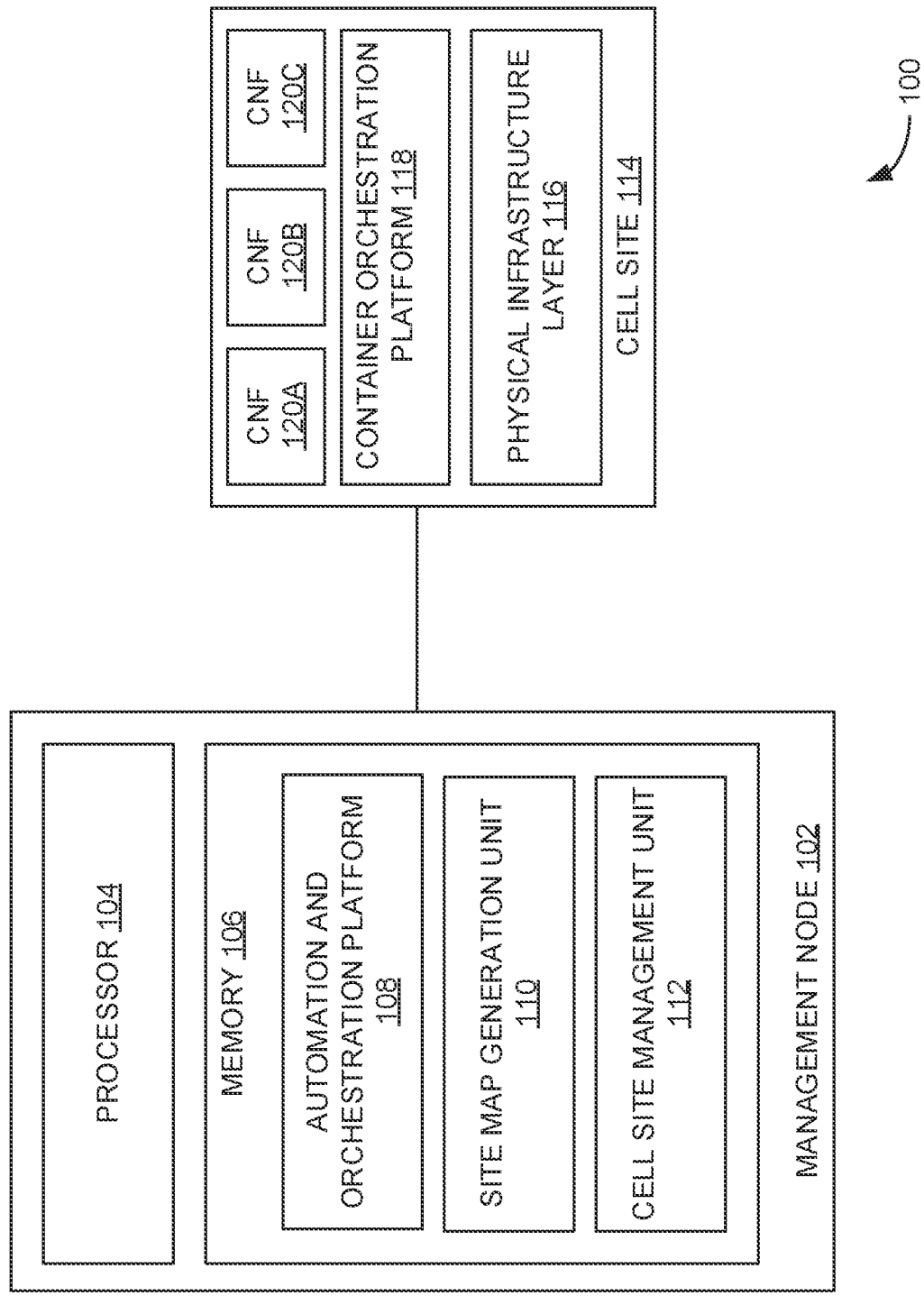
FIG. 1 is a block diagram of an example system, including a management node to manage a cell site in a 5G radio-access network (RAN)

The drawings described herein are for illustrative purposes and are not intended to limit the scope of the present subject matter in any way.

DETAILED DESCRIPTION

Examples described herein may provide an enhanced computer-based and/or network-based method, technique, and system to monitor and/or manage cell sites in 5G radio-access networks (RAN).

A RAN is a part of a telecommunications system that connects individual user devices (e.g., a smart phone, a personal computer, and the like) to other parts of a network through radio connections. The RAN may reside between the user devices and provides a connection with its core network. The RAN is a major component of wireless telecommunications and has evolved through the generations of mobile networking leading up to 5G. The RAN provides access to and coordinates the management of resources across cell sites.

The telecommunication industry is accelerating as transition to 5G business, container orchestration platform, and cloud-native network functions (CNFs) solutions are getting more attention and deployment. A container orchestration platform can have multiple pods, with each pod representing a group of one or more application containers, as well as some shared resources for those containers. A container orchestration platform can host different container-based platforms that support different functions. For example, a container-based platform can be added to a container orchestration platform to support telco CNFs. Further, the container-based platform can be added to the container orchestration platform to support Telco RAN CNFs and to make sure that the Infra as a Service (IaaS) and Containers as a service (CaaS) platforms meet network functions' (NFs') requirements and achieve good performance per 5G standards.

In some examples such as 4G network deployments, the RAN cell sites had vertically integrated solutions and the management interface was a closed source. Further, the hardware that was running the RAN software was also proprietary. There was no play for companies like VMware in the 4G network deployments. In 5G, the RAN cell site for the first time would be deployed on commercial-off-the-shelf (COTS) hardware. Further, the RAN software (e.g., containerized network function (CNF)) is deployed on Kubernetes platform, which is also open source. Thus, it is possible for third-party vendors (e.g., such as VMware) to deploy and manage the life cycle management (LCM) of the cell-sites. In such an environment, stringent latency requirements and the ultra-high speeds imply that a significantly large number of cell sites may have to be deployed. For example, the number of base-stations that has to be deployed in a country such as the USA may be in the range of 250,000-300,000.

In an example, Telco Cloud Automation (TCA) is a VMware solution that is responsible for all three functions (e.g., hardware provisioning, K8s provisioning, and CNF deployment). In TCA terminology, the cell-site needs to go through three stages for site provisioning such as host provisioning (e.g., zero-touch provisioning (ZTP)), K8s provisioning (e.g., containers as a service (CAAS)), and network function deployment (e.g., CNF).

In some existing methods, solutions for the 5G Cloud RAN are based on a cloud-native software to handle compute functionality in the RAN. Cloud RAN disaggregate the RAN hardware and software. Further, Cloud RAN may enable the communication service providers with respect to flexibility, faster services delivery, and greater networks scalability. In some example scenarios, there will be tens of thousands of RAN sites in 5G Cloud RAN, which may in turn includes tens of thousands of physical servers with significantly more numbers of virtualization nodes running there. Each of the virtualization node may provide multiple network functions as service applications for the Telco end users, for instance. Thus, it may be a challenge to manage each cell-site's hardware and software efficiently and intelligently in a significantly huge RAN cloud.

For example, there are three layers of resources in the 5G Cloud RAN such as a hardware layer, a virtualization layer, and a network function layer. In this example, the 5G Cloud RAN administrator may have to take care of components running in each layer to make sure the whole RAN works as expected. However, with the tens of thousands of sites, detecting the issue on the cell sites of the Cloud RAN in time may be challenging. Further, efficiently diagnosing the root cause on the failure of cell sites from all the network function layer, virtualization layer, and the hardware layer may be challenging.

In some examples, for the hardware layer, the hardware companies deploy servers with their own hardware management solutions. For the virtualization layer, such as the Kubernetes cluster nodes, there are kinds of business customization dashboards or the other solutions such as Prometheus. For the network function layer, each 5G application vendor may supply different application monitoring tools to the Telco administrator. Further, the telco administrator may have to monitor different layers with different management solutions. When a cell site is in a failure state, the administrator may start the debugging journey beginning from the 5G applications to the end of hardware servers with various management tools to detect the issues. When some hardware issue is present, then the administrator may have to first detect the 5G applications running on the virtualization nodes that locate on the server to retire the whole broken site stack in order.

Hence, in the existing approach:
  The Telco administrator may have to be aware (e.g., to have the knowledge) and be familiar with the management solutions for the three layers by different vendors.
  For each RAN cell site, the administrator may be unaware of the status overview of the cell sites in real-time to discover the issues, which may be the enormous risk for the telecom operator.
  When a cell site is in an abnormal state, the administrator may have to go through all the layers one by one to find out the root cause, since the failure point not always alive on the place where the error been raised, such as the 5G applications down may be caused by the hardware network issue.
  To delete all the cell site resources from the Cloud RAN, the Telco administrator may have to call different management tools for each of layer's resource and clean up separately.

Examples described herein may provide a management node to manage cell sites in a 5G RAN. The management node may determine a physical infrastructure layer, a container orchestration platform on the physical infrastructure layer, and a containerized network function (CNF) instance associated with the 5G RAN in the container orchestration platform based on a site identifier associated with the cell site. Based on the physical infrastructure layer, the container orchestration platform, and the CNF instance, the management node may build a logical site resource map representing topological information of the cell site. Further, the management node may monitor and/or manage the cell site using the logical site resource map. Thus, examples described herein may provide a unified platform to manage the hardware layer, virtualization layer, and network function layer for RAN sites.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Referring now to the figures, FIG. 1 is a block diagram of an example system 100, including a management node 102 to manage a cell site 114 in a 5G radio-access network (RAN). In some examples, the 5G RAN is an architecture in wireless communication which uses 5G radio frequencies to provide wireless connectivity to user devices. An example user device may be a smart phone, a tablet computer, a laptop computer, a handheld computer, a personal digital assistant (PDA), a wearable device, an Internet of Things (IoT) device, an email device, a desktop computer, or an appropriate combination of any two or more of these devices or other data processing stationary or portable devices. Further, the 5G RAN may rely on a fully coordinated, multi-layer network with low-band, mid-band, and high-band to provide wireless connectivity to devices and deliver the best network performance. New 5G use cases may deliver new revenue streams for communication service providers (CSPs) and new connectivity opportunities for subscribers (e.g., use cases may include cloud gaming, virtual reality (VR)/augmented reality (AR), autonomous driving fixed wireless access, and the like).

Further, the RAN is a key component of a mobile telecommunication system that connects the user devices to a network via a radio link. This may be achieved by converting voice and data into digital signals and transmitting them as radio waves to RAN transceivers, which then forward them onto the core network. From the core network, the data can be sent to the internet. Furthermore, to achieve such connections between the user devices and the network, at least one cell site (e.g., 114) may be provisioned.

In some examples, cell site 114 may include a physical infrastructure layer 116, a container orchestration platform 118 on physical infrastructure layer 116, and multiple containerized network function (CNF) instances 120A, 120B, and 120C associated with the 5G RAN in container orchestration platform 118. Physical infrastructure layer 116 may include compute, storage, and network resources for cell site 114. Container orchestration platform 118 may provide automation of operational effort to run containerized workloads and services. This includes a wide range of things software teams need to manage a container's lifecycle, including provisioning, deployment, scaling (up and down), networking, load balancing, and the like. For example, Kubernetes, also known as K8s, is an open-source container orchestration platform 118 for automating computer application deployment, scaling, and management. A Kubernetes cluster includes a set of worker machines or nodes to distribute workload, with each node running containerized applications. A Kubernetes node may be either a virtual or a physical machine, depending on the cluster. A Kubernetes node runs a process responsible for communication between the Kubernetes control plane and the node. The Kubernetes node manages the Pods and the containers running on a machine. A Kubernetes cluster may have a master node that controls and manages the worker nodes of the cluster and act as the frontend of the cluster.

In an example, cell sites (e.g., 114) may be managed by management node 102. Further, management node 102 may include a processor 104. Processor 104 may refer to, for example, a central processing unit (CPU), a semiconductor-based microprocessor, a digital signal processor (DSP) such as a digital image processing unit, or other hardware devices or processing elements suitable to retrieve and execute instructions stored in a storage medium, or suitable combinations thereof. Processor 104 may, for example, include single or multiple cores on a chip, multiple cores across multiple chips, multiple cores across multiple devices, or suitable combinations thereof. Processor 104 may be functional to fetch, decode, and execute instructions as described herein. Further, management node 102 includes memory 106 coupled to processor 104. In an example, memory 106 may include an automation and orchestration platform 108, a site map generation unit 110, and a cell site management unit 112. Furthermore, processor 104 may execute automation and orchestration platform 108, site map generation unit 110, and cell site management unit 112 stored in memory 106.

During operation, automation and orchestration platform 108 may deploy and manage cell site 114 in the 5G RAN. In an example, automation and orchestration platform 108 may tag a site identifier to a node pool running on container orchestration platform 118 during deployment of the node pool. For example, the node pool may include a group of nodes within a cluster having similar configuration. Further, each node may be a virtual or physical machine, depending on the cluster.

Based on the site identifier associated with the cell site, site map generation unit 110 may determine physical infrastructure layer 116, container orchestration platform 118, and CNF instances 120A-120C. Further, based on physical infrastructure layer 116, container orchestration platform 118, and CNF instances 120A-120C, site map generation unit 110 may build a logical site resource map representing topological information of cell site 114. The logical site resource map may refer to an end-to-end topology map that shows, in a single view, the physical and logical connectivity and relationships (e.g., parent and child) between the underlying network infrastructure and the software components that compose the 5G RAN, including networking, hardware, virtualization, containers as a service, and application layers (i.e., CNFs) for multiple vendors and domains.

In an example, site map generation unit 110 may receive a request to generate the logical site resource map. The request may include the site identifier. Based on the site identifier, site map generation unit 110 may determine a node pool running on container orchestration platform 118. In this example, site map generation unit 110 may determine a cluster of node pools associated with multiple cell sites (e.g., 114) from an automation and orchestration platform and determine the node pool running on container orchestration platform 118 corresponding to the site identifier from the cluster of node pools.

Furthermore, site map generation unit 110 may determine physical infrastructure layer 116 that runs the node pool. In an example, upon determining the node pool, site map generation unit 110 may determine, from a virtualization management application, virtual machines that are part of the node pool running on container orchestration platform 118. An example virtualization management application is VMware® vCenter™ Server (i.e., a centralized management utility to manage virtual machines). Further, site map generation unit 110 may determine, from the virtualization management application, one or more host computing systems that executes the virtual machines.

Further, site map generation unit 110 may determine CNF instances 120A-120C running on the node pool. In an example, site map generation unit 110 may determine, from automation and orchestration platform 108, the CNF instance running on the node pool. An example automation and orchestration platform 108 is VMware Telco Cloud Platform™.

Furthermore, cell site management unit 112 may monitor and/or manage cell site 114 using the logical site resource map. In an example, based on the logical site resource map, cell site management unit 112 may present via a user interface a topology associated with cell site 114 to a user.

In an example, cell site management unit 112 may receive a request to monitor health of cell site 114. The request may include the site identifier. Upon receiving the request, cell site management unit 112 may retrieve the logical site resource map corresponding to the site identifier. Further, cell site management unit 112 may determine physical infrastructure layer 116, container orchestration platform 118, and CNF instances 120A-120C associated with cell site 114 using the logical site resource map. Furthermore, cell site management unit 112 may monitor the health of resources associated with CNF instances 120A-120C, container orchestration platform 118, and physical infrastructure layer 116.

Further, cell site management unit 112 may generate, on a user interface, a status report indicating the health of the resources associated with CNF instances 120A-120C, container orchestration platform 118, and physical infrastructure layer 116. Based on the health of the resources, cell site management unit 112 may enable to detect, via the user interface, an issue from any of the resources associated with CNF instances 120A-120C, container orchestration platform 118, and physical infrastructure layer 116.

In another example, cell site management unit 112 may receive a request to delete cell site 114. The request may include the site identifier. Upon receiving the request, cell site management unit 112 may retrieve the logical site resource map corresponding to the site identifier. Further, cell site management unit 112 may determine the physical infrastructure layer 116, container orchestration platform 118, and CNF instances 120A-120C associated with cell site 114 using the logical site resource map. Furthermore, cell site management unit 112 may perform terminating the CNF instance, terminating resources of the container orchestration platform, and deprovisioning hardware, software, and/or network configurations of the physical infrastructure layer in a defined order.

Figure 2:
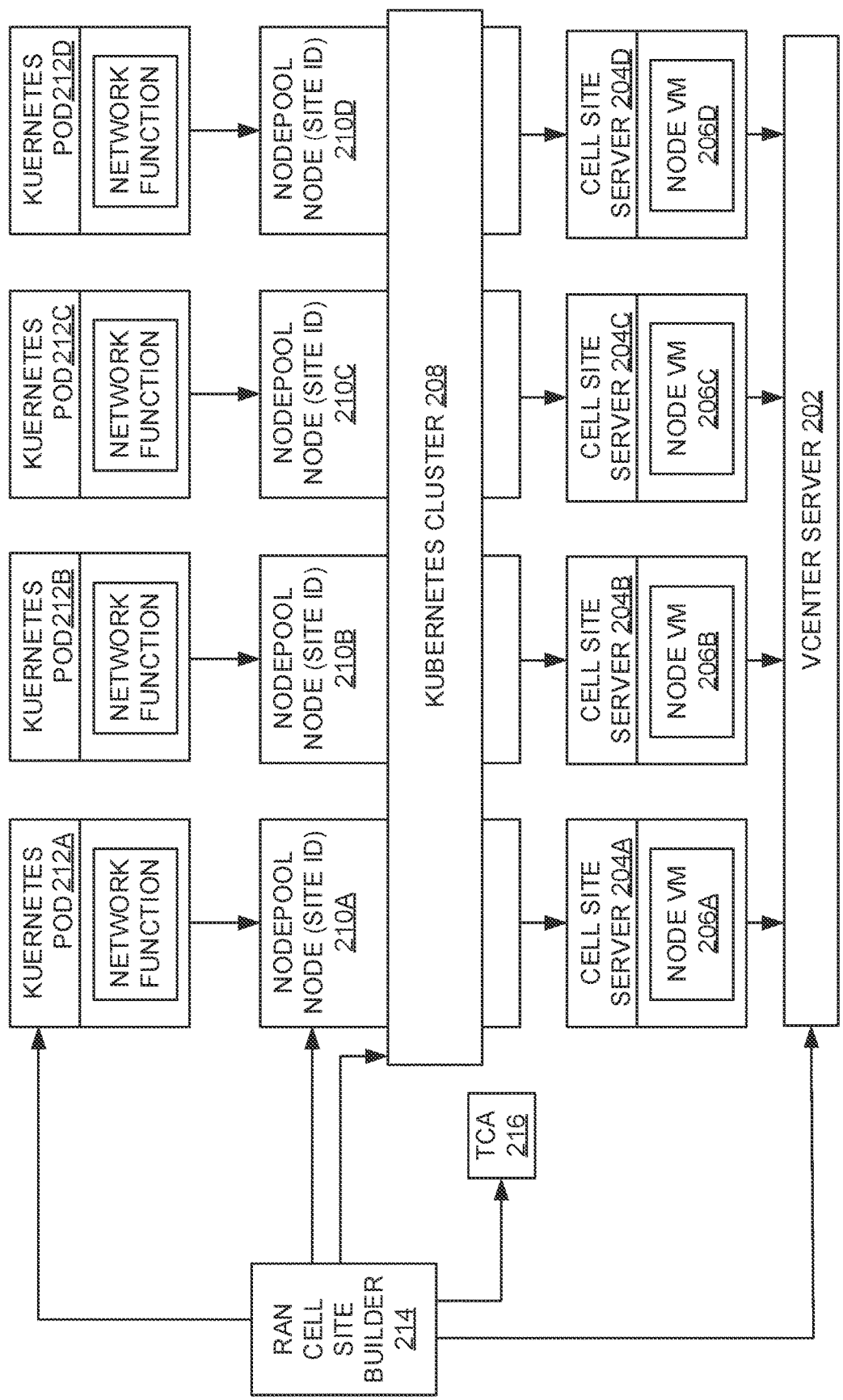
FIG. 2 is a block diagram of another example system, including a RAN cell site builder to manage a cell site in a 5G RAN.

FIG. 2 is a block diagram of another example system 200, including a RAN cell site builder 214 to monitor and/or manage a cell site in a 5G RAN. As shown in FIG. 2, the cell site may include a hardware management layer such as a vCenter server 202 and a virtualization layer such as a Kubernetes cluster 208. Further, vCenter server 202 may support multiple cell site servers 204A-204D including corresponding node virtual machines 206A-206D deployed therein.

In some examples, Kubernetes cluster 208 may include a set of worker machines or nodes 210A-210D to distribute workload, with each node running containerized applications. A Kubernetes node may be either a virtual or a physical machine, depending on the cluster. A Kubernetes node runs a process responsible for communication between the Kubernetes control plane and the node. The Kubernetes node manages pods 212A-212D and the containers associated with pods 212A-212D. A Kubernetes cluster may have a master node that controls and manages the worker nodes of the cluster and acts as the front end of the cluster.

A Telco cloud automation (TCA) platform 216 is a software-defined, highly resilient cloud infrastructure that allows telecommunications service providers (telcos) to add services, respond to changes in network demand, and manage central and decentralized resources efficiently. For example, VMware Telco Cloud Platform™ (e.g., 5G Edition) is a cloud-native platform powered by field-proven VMware Telco Cloud Infrastructure™ coupled with automation, providing a cloud-first approach that delivers operational agility for virtual, cloud-native 5G, and Edge network functions. Telco Cloud Platform 216 may facilitate Communication Service Providers (CSPs) expedite the innovation cycle to deliver new applications and services, reduce operational complexities, and achieve substantial TCO savings over other approaches, further accelerating CSPs' cloud modernization journey to 5G.

In an example, system 200 may include TCA 216, which is a VMware solution, to support hardware (e.g., cell site servers 204A-204D) provision, Kubernetes cluster 208 deployment with the worker nodes of node pools 210A-210D and the further network function instantiation. Further, there is a user specific global unique label which been used as site identifier (ID) on each node pool 210A-210D.

In an example, system 200 may include RAN cell site builder 214 to build logical site resource map using the site identifier, which may act as an index for the next operations. For example, the progress to build the site resource map may start from the node pool with the site identifier label, then fetch both the network functions running on the node pool and the target hardware server where the worker nodes of this node pool located by the hardware resources and consumed by the node pool.

In an example site deployment scenario, a Telco administrator may have to set the site identifier in the payload to the TCA with the site hardware, node pool (NP), and network function (NF) information. Further, the logical site resource map may be built accordingly. In this example, there is no tight coupling requirement for the three layers of the cell site, which means there is no need for the different vendors for the hardware, virtualization, and 5G applications to take care the site relationship for each other, instead they can focus on their own functions.

In some examples, network functions virtualization is a network architecture concept that uses the technologies of information technology virtualization to virtualize entire classes of network node functions into building blocks that may connect, or chain together, to create communication services. Examples of network functions or features may include session management function (SMF), enabling SRIOV (Single Root I/O virtualization) interfaces, configuring passthrough devices, real-time or specific version kernel swapping, enabling a custom GRUB (Grand Unified Bootloader) configuration, enabling huge pages, adding and configuring specific add-on packages, low latency settings, and NUMA (non-uniform memory access) alignment of processors, memory and passthrough devices.

Further, examples described herein may monitor the cell site. For example, with the support of this logical site resource map on RAN cell site builder 214, the Telco administrator may be able to monitor the resources from the different layers under the same view. This may also be helpful to detect the cell site issue from all the three layers at once and show the failure points in one-stop.

Furthermore, examples described herein may provide an option to delete the cell site. For example, unlike the existing solutions to delete the cell site resources one by one by the different management tools from the different vendors, examples described herein may provide the Telco administrator an option to pass the target cell site identifier. Further, with the built site resource map on cell site builder 214, cleaning up of the cell site resources may be triggered with the target management tools by the different layer's vendor in a correct sequence automatically.

Figure 3:
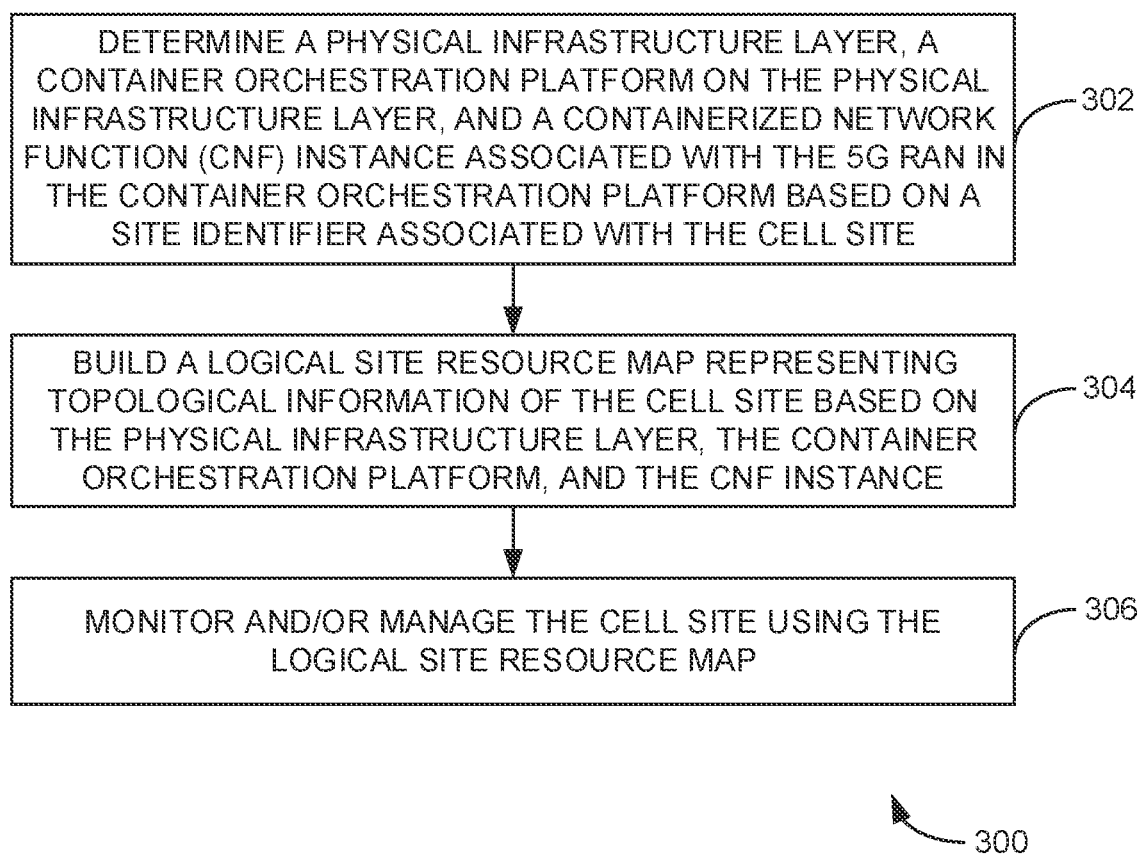
FIG. 3 is a flow diagram illustrating an example method for managing a cell site in a 5G RAN.

FIG. 3 is a flow diagram illustrating an example method 300 for managing a cell site in a 5G radio-access network (RAN). Example method 300 depicted in FIG. 3 represents generalized illustrations, and other processes may be added, or existing processes may be removed, modified, or rearranged without departing from the scope and spirit of the present application. In addition, method 300 may represent instructions stored on a computer-readable storage medium that, when executed, may cause a processor to respond, to perform actions, to change states, and/or to make decisions. Alternatively, method 300 may represent functions and/or actions performed by functionally equivalent circuits like analog circuits, digital signal processing circuits, application specific integrated circuits (ASICs), or other hardware components associated with the system. Furthermore, the flow chart is not intended to limit the implementation of the present application, but the flow chart illustrates functional information to design/fabricate circuits, generate computer-readable instructions, or use a combination of hardware and computer-readable instructions to perform the illustrated processes.

At 302, based on a site identifier associated with the cell site, a physical infrastructure layer, a container orchestration platform on the physical infrastructure layer, and a containerized network function (CNF) instance associated with the 5G RAN in the container orchestration platform may be determined. In an example, the site identifier may be tagged to a node pool running on the container orchestration platform during deployment of the node pool. The node pool may include a group of nodes within a cluster having similar configuration. Further, each node may be a virtual or physical machine, depending on the cluster.

In an example, determining the physical infrastructure layer, the container orchestration platform, and the CNF instance may include receiving a request to generate the logical site resource map, the request comprising the site identifier. Based on the site identifier, a node pool running on the container orchestration platform may be determined. In an example, determining the node pool running on the container orchestration platform may include determining a cluster of node pools associated with multiple cell sites from an automation and orchestration platform, and determining the node pool running on the container orchestration platform corresponding to the site identifier from the cluster of node pools. Further, the CNF instance running on the node pool may be determined.

Furthermore, the physical infrastructure layer that runs the node pool may be determined. In an example, determining the physical infrastructure layer that runs the node pool may include determining, from a virtualization management application, virtual machines that are part of the node pool running on the container orchestration platform. Further, one or more host computing systems that executes the virtual machines may be determined from the virtualization management application. In another example, determining the physical infrastructure layer that runs the node pool may include determining, from the automation and orchestration platform, the CNF instance running on the node pool.

At 304, based on the physical infrastructure layer, the container orchestration platform, and the CNF instance, a logical site resource map representing topological information of the cell site may be built.

At 306, the cell site may be monitored and/or managed using the logical site resource map. In an example, managing the cell site may include receiving a request to delete the cell site. The request may include the site identifier. Upon receiving the request, the logical site resource map corresponding to the site identifier may be retrieved. Further, the physical infrastructure layer, the container orchestration platform, and the CNF instance associated with the cell site may be determined using the logical site resource map. Furthermore, terminating the CNF instance, terminating resources of the container orchestration platform, and deprovisioning hardware, software, and/or network configurations of the physical infrastructure layer may be performed in a defined order.

In an example, monitoring the cell site may include receiving a request to monitor a health of the cell site. The request may include the site identifier. Upon receiving the request, the logical site resource map corresponding to the site identifier may be retrieved. Further, the physical infrastructure layer, the container orchestration platform, and the CNF instance associated with the cell site may be determined using the logical site resource map. Furthermore, the health of resources associated with the CNF instance, the container orchestration platform, and the physical infrastructure layer may be monitored.

In an example, based on the logical site resource map, example method 300 may include presenting via a user interface a topology associated with the cell site to a user. For example, a status report indicating the health of the resources associated with the CNF instance, the container orchestration platform, and the physical infrastructure layer may be generated on the user interface. Based on the health of the resources, detecting, via the user interface, an issue from any of the resources associated with the CNF instance, the container orchestration platform, and the physical infrastructure layer may be enabled.

Figure 4:
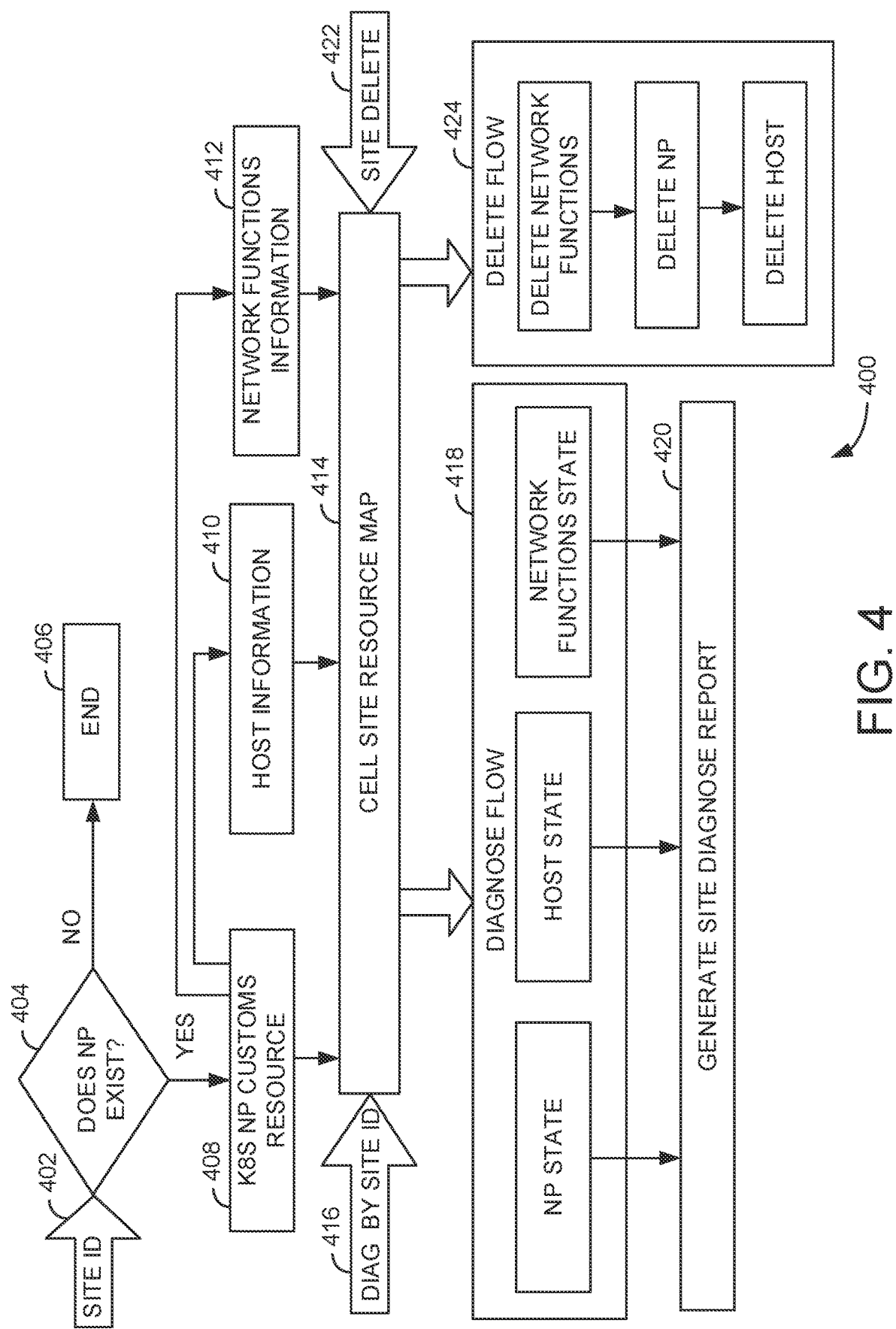
FIG. 4 is a block diagram illustrating another example process for managing a cell site in a 5G RAN.

FIG. 4 is a block diagram illustrating another example process 400 for monitoring and/or managing a cell site in a 5G RAN. At 402, a request to generate a cell site resource map may be provided. The request may include a cell site identifier (ID). At 404, a check may be made to determine whether a node pool (NP) exists based on the cell site ID. When the node pool does not exist, process 400 may be terminated, at 406. When the node pool corresponding to the cell site ID exists, K8s node pool (NP) custom resources may be determined, at 408. For example, at 408, a node pool corresponding to the cell side ID may be fetched. Further, a cluster associated with the node pool may be fetched. Furthermore, cluster Kubernetes configurations may be retrieved from TCA. Also, vCenter access information may be fetched from the cluster with the Kubernetes configurations. Further, node pool datastore information may be fetched from the cluster with the Kubernetes configurations. Furthermore, at 410, host information may be checked. For example, host name may be retrieved by a target datastore from vCenter with the fetched vCenter access information. Further, at 412, network function (NF) information may be checked. For example, network function namespaces and names information, which is running on the node pool may be fetched from TCA.

At 414, a cell site resource map may be generated using the K8s node pool custom resources, the host information, and the network function (NF) information. In an example, at 416, a request to monitor or diagnose the cell site may be received. The request may include the cell site ID. Upon receiving the request to monitor the cell site, a diagnose flow may be executed, at 418. For example, a node pool state, a host state, and network functions state may be determined using the cell site resource map. For the node pool state, the node pool diagnose information may be collected from the custom resources on the K8s cluster with the fetched Kubernetes configurations. For the host state, real-time host information may be collected from vCenter. The real-time host information may include central processing unit (CPU) or memory usage, a virtual-machine network interface card (e.g., VMNIC) status, and the like. Further, real-time node virtual machine information may be collected from vCenter. The real-time node virtual machine information may include virtual machine power status, internet protocol (IP) addresses, and the like. For the network functions state, the network functions running on the node pool may be fetched from TCA. Further, the network functions information may be collected from the TCA. Furthermore, the network functions pods information may be collected from K8s. Upon determining the node pool state, the host state, and the network functions state, a site diagnoses report may be generated, at 420.

In another example, at 422, a request to delete the cell site may be received. The request may include the cell site ID. Upon receiving the request to delete the cell site, a delete flow may be executed at 424. For example, the network functions, the node pool, and the host may be deleted, for instance, in a sequence based on the cell site resource map.

Thus, examples described herein may provide a unified platform to manage the hardware layer, virtualization layer, and network function layer for RAN sites. For example, the described approach may manage the site resources across the hardware layer, virtualization layer, and the network function layer, which are supplied by different vendors. Examples described herein may be used to build a loose coupling logical resources map index using the site identifier, which is labelled on the node pool for each site. Further, with the examples described herein, there is no extra configuration needed to create such a cell site resource map for the resources under each layer supplied by the different vendors. Thus, examples described herein may provide a method to build the cell site resource map starting from fetching the node pool information and its health status with the target site identifier. Further, both the hardware information and associated health status, network functions information and associated health status may be fetched in parallel with the placement attributes from the node pool.

Also, the cell site resource map may show the Telco administrator one-stop site resource relationship overview with all the three layers supplied by different vendors. Further, the cell site resource map may be used to determine real-time health status for the three layers for diagnosing the cell site issues. In addition, the cell site resource map may be used for cell site resources deletion from 5G Cloud RAN.

Thus, examples described herein may provide advantages such as:
- Logical site resource relationship which may not require any more configuration on the hardware layer, the virtualization layer, and the network function layer by different vendors.

One-stop administrator-oriented site resources monitor and management to avoid jumping between different layers with different vendor tools.

Show the failure points from different layers for the issue sites in the global view.

Easier site resources deletion flow using the site identifier.

Figure 5:
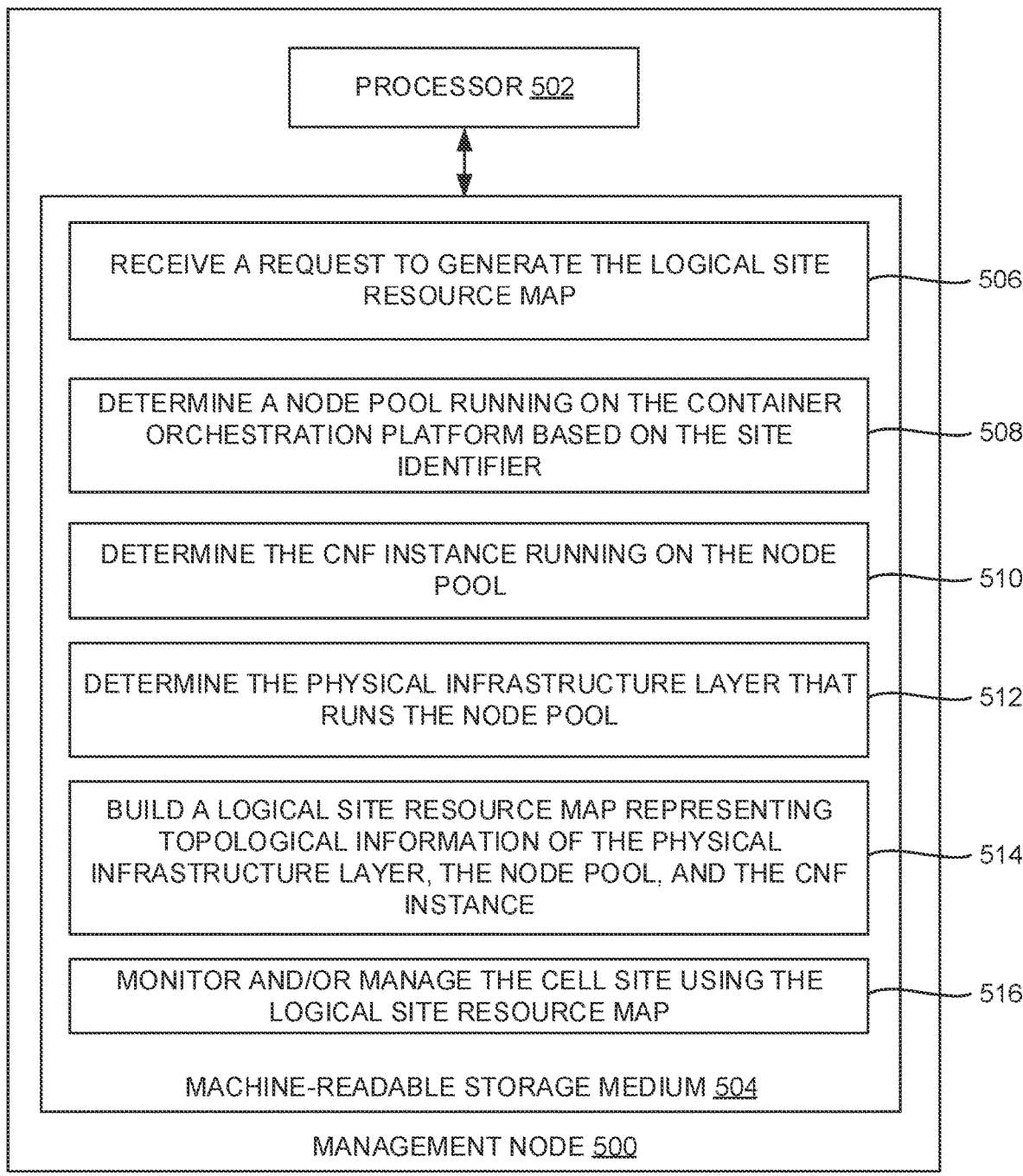
FIG. 5 is a block diagram of an example management node including non-transitory computer-readable storage medium storing instructions to monitor/manage a cell site in a 5G RAN.

FIG. 5 is a block diagram of an example management node 500 including non-transitory computer-readable storage medium 504 storing instructions to monitor/manage a cell site in a 5G radio-access network (RAN). Management node 500 may include a processor 502 and computer-readable storage medium 504 communicatively coupled through a system bus. Processor 502 may be any type of central processing unit (CPU), microprocessor, or processing logic that interprets and executes computer-readable instructions stored in computer-readable storage medium 504. Computer-readable storage medium 504 may be a random-access memory (RAM) or another type of dynamic storage device that may store information and computer-readable instructions that may be executed by processor 502. For example, computer-readable storage medium 504 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, computer-readable storage medium 504 may be a non-transitory computer-readable medium. In an example, computer-readable storage medium 504 may be remote but accessible to management node 500.

Computer-readable storage medium 504 may store instructions 506, 508, 510, 512, 514, and 516. Instructions 506 may be executed by processor 502 to receive a request to generate the logical site resource map. In an example, the request may include the site identifier of a cell site that includes a physical infrastructure layer, a container orchestration platform on the physical infrastructure layer, and a containerized network function (CNF) instance associated with the 5G RAN in the container orchestration platform. In an example, computer-readable storage medium 504 may store instructions to tag the site identifier to a node pool running on the container orchestration platform during deployment of the node pool. The node pool may include a group of nodes within a cluster having similar configuration. Further, each node may be a virtual or physical machine, depending on the cluster.

Based on the site identifier, instructions 508 may be executed by processor 502 to determine a node pool running on the container orchestration platform. In an example, instructions 508 to determine the node pool running on the container orchestration platform may include instructions to determine, from an automation and orchestration platform, a cluster of node pools associated with multiple cell sites, and determine the node pool running on the container orchestration platform corresponding to the site identifier from the cluster of node pools.

Instructions 510 may be executed by processor 502 to determine the CNF instance running on the node pool. Instructions 512 may be executed by processor 502 to determine the physical infrastructure layer that runs the node pool. In an example, instructions 512 to determine the physical infrastructure layer that runs the node pool may include instructions to determine, from a virtualization management application, virtual machines that are part of the node pool running on the container orchestration platform, and determine, from the virtualization management application, one or more host computing systems that executes the virtual machines. In another example, instructions 512 to determine the physical infrastructure layer that runs the node pool may include instructions to determine, from the automation and orchestration platform, the CNF instance running on the node pool.

Instructions 514 may be executed by processor 502 to build a logical site resource map representing topological information of the physical infrastructure layer, the node pool, and the CNF instance. Instructions 516 may be executed by processor 502 to monitor and/or manage the cell site using the logical site resource map. In an example, instructions 516 to manage the cell site may include instructions to receive a request to delete the cell site. The request may include the site identifier. Upon receiving the request, the logical site resource map corresponding to the site identifier may be retrieved. Further, the physical infrastructure layer, the container orchestration platform, and the CNF instance associated with the cell site may be determined using the logical site resource map. Furthermore, terminating the CNF instance, terminating resources of the container orchestration platform, and deprovisioning hardware, software, and/or network configurations of the physical infrastructure layer may be performed in a defined order.

In an example, instructions 516 to monitor the cell site may include instructions to receive a request to monitor health of the cell site. The request may include the site identifier. Upon receiving the request, the logical site resource map corresponding to the site identifier may be retrieved. Further, the physical infrastructure layer, the container orchestration platform, and the CNF instance associated with the cell site may be determined using the logical site resource map. Furthermore, the health of resources associated with the CNF instance, the container orchestration platform, and the physical infrastructure layer may be monitored. Further, a status report indicating the health of the resources associated with the CNF instance, the container orchestration platform, and the physical infrastructure layer may be generated on a user interface. Based on the health of the resources, detecting, and diagnosing, via the user interface, an issue from any of the resources associated with the CNF instance, the container orchestration platform, and the physical infrastructure layer may be enabled.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not be meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A method for managing a cell site in a 5G radio-access network (RAN) comprising:
    based on a site identifier associated with the cell site, determining a physical infrastructure layer, a container orchestration platform on the physical infrastructure layer, and a containerized network function (CNF) instance associated with the 5G RAN in the container orchestration platform;
    based on the physical infrastructure layer, the container orchestration platform, and the CNF instance, building a logical site resource map representing topological information of the cell site; and
    monitoring and/or managing the cell site using the logical site resource map.

2. The method of claim 1, wherein determining the physical infrastructure layer, the container orchestration platform, and the CNF instance comprises:
    receiving a request to generate the logical site resource map, the request comprising the site identifier;
    based on the site identifier, determining a node pool running on the container orchestration platform;
    determining the CNF instance running on the node pool; and
    determining the physical infrastructure layer that runs the node pool.

3. The method of claim 2, wherein determining the node pool running on the container orchestration platform comprises:
    determining a cluster of node pools associated with multiple cell sites from an automation and orchestration platform; and
    determining the node pool running on the container orchestration platform corresponding to the site identifier from the cluster of node pools.

4. The method of claim 2, wherein determining the physical infrastructure layer that runs the node pool comprises:
    determining, from a virtualization management application, virtual machines that are part of the node pool running on the container orchestration platform; and
    determining, from the virtualization management application, one or more host computing systems that executes the virtual machines.

5. The method of claim 2, wherein determining the CNF instance running on the node pool comprises:
    determining, from the automation and orchestration platform, the CNF instance running on the node pool.

6. The method of claim 1, further comprising:
    based on the logical site resource map, presenting via a user interface a topology associated with the cell site to a user.

7. The method of claim 1, wherein managing the cell site comprises:
    receiving a request to delete the cell site, the request comprising the site identifier;
    upon receiving the request, retrieving the logical site resource map corresponding to the site identifier;
    determining the physical infrastructure layer, the container orchestration platform, and the CNF instance associated with the cell site using the logical site resource map; and
    performing terminating the CNF instance, terminating resources of the container orchestration platform, and deprovisioning hardware, software, and/or network configurations of the physical infrastructure layer in a defined order.

8. The method of claim 1, wherein monitoring the cell site comprises:
    receiving a request to monitor a health of the cell site, the request comprising the site identifier;
    upon receiving the request, retrieving the logical site resource map corresponding to the site identifier;
    determining the physical infrastructure layer, the container orchestration platform, and the CNF instance associated with the cell site using the logical site resource map; and
    monitoring the health of resources associated with the CNF instance, the container orchestration platform, and the physical infrastructure layer.

9. The method of claim 8, further comprising:
    generating, on a user interface, a status report indicating the health of the resources associated with the CNF instance, the container orchestration platform, and the physical infrastructure layer; and
    based on the health of the resources, enabling to detect, via the user interface, an issue from any of the resources associated with the CNF instance, the container orchestration platform, and the physical infrastructure layer.

10. The method of claim 1, further comprising:
    tagging the site identifier to a node pool running on the container orchestration platform during deployment of the node pool, wherein the node pool comprises a group of nodes within a cluster having similar configuration, and wherein each node is a virtual or physical machine, depending on the cluster.

11. A management node comprising:
    a processor; and
    memory coupled to the processor, wherein the memory comprises:
    an automation and orchestration platform that deploys and manages a cell site in the 5G radio-access network (RAN), wherein the cell site comprises a physical infrastructure layer, a container orchestration platform on the physical infrastructure layer, and a containerized network function (CNF) instance associated with the 5G RAN in the container orchestration platform;
    a site map generation unit to:
        based on a site identifier associated with the cell site, determine the physical infrastructure layer, the container orchestration platform, and the CNF instance; and
        based on the physical infrastructure layer, the container orchestration platform, and the CNF instance, build a logical site resource map representing topological information of the cell site; and
    a cell site management unit to monitor and/or manage the cell site using the logical site resource map.

12. The management node of claim 11, wherein the site map generation unit is to:
    receive a request to generate the logical site resource map, the request comprising the site identifier;
    based on the site identifier, determine a node pool running on the container orchestration platform;
    determine the CNF instance running on the node pool; and
    determine the physical infrastructure layer that runs the node pool.

13. The management node of claim 12, wherein the site map generation unit is to:

determine a cluster of node pools associated with multiple cell sites from the automation and orchestration platform; and determine the node pool running on the container orchestration platform corresponding to the site identifier from the cluster of node pools.

14. The management node of claim 12, wherein the site map generation unit is to:

determine, from a virtualization management application, virtual machines that are part of the node pool running on the container orchestration platform; and determine, from the virtualization management application, one or more host computing systems that executes the virtual machines.

15. The management node of claim 12, wherein the site map generation unit is to:

determine, from the automation and orchestration platform, the CNF instance running on the node pool.

16. The management node of claim 11, wherein the cell site management unit is to:

based on the logical site resource map, present via a user interface a topology associated with the cell site to a user.

17. The management node of claim 11, wherein the automation and orchestration platform is to:

tag the site identifier to a node pool running on the container orchestration platform during deployment of the node pool, wherein the node pool comprises a group of nodes within a cluster having similar configuration, and wherein each node is a virtual or physical machine, depending on the cluster.

18. The management node of claim 11, wherein the cell site management unit is to:

receive a request to delete the cell site, the request comprising the site identifier;

upon receiving the request, retrieve the logical site resource map corresponding to the site identifier;

determine the physical infrastructure layer, the container orchestration platform, and the CNF instance associated with the cell site using the logical site resource map; and perform terminating the CNF instance, terminating resources of the container orchestration platform, and deprovisioning hardware, software, and/or network configurations of the physical infrastructure layer in a defined order.

19. A non-transitory computer readable storage medium comprising instructions executable by a processor of a management node to:

receive a request to generate the logical site resource map, the request comprising the site identifier of a cell site that includes a physical infrastructure layer, a container orchestration platform on the physical infrastructure layer, and a containerized network function (CNF) instance associated with the 5G RAN in the container orchestration platform;

based on the site identifier, determine a node pool running on the container orchestration platform;

determine the CNF instance running on the node pool;

determine the physical infrastructure layer that runs the node pool;

build a logical site resource map representing topological information of the physical infrastructure layer, the node pool, and the CNF instance; and monitor and/or manage the cell site using the logical site resource map.

20. The non-transitory computer readable storage medium of claim 19, wherein instructions to determine the node pool running on the container orchestration platform comprise instructions to:

determine, from an automation and orchestration platform, a cluster of node pools associated with multiple cell sites; and determine the node pool running on the container orchestration platform corresponding to the site identifier from the cluster of node pools.

* * * * *